United States Patent
Knappe et al.

(10) Patent No.: US 7,200,214 B2
(45) Date of Patent: Apr. 3, 2007

(54) METHOD AND SYSTEM FOR PARTICIPANT CONTROL OF PRIVACY DURING MULTIPARTY COMMUNICATION SESSIONS

(75) Inventors: Michael E. Knappe, Sunnyvale, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/279,983

(22) Filed: Apr. 17, 2006

(65) Prior Publication Data

US 2006/0181608 A1    Aug. 17, 2006

Related U.S. Application Data

(63) Continuation of application No. 09/751,799, filed on Dec. 29, 2000, now Pat. No. 7,058,168.

(51) Int. Cl.
*H04M 3/42* (2006.01)
*H04L 12/16* (2006.01)
*H04Q 11/00* (2006.01)
*G06F 15/16* (2006.01)

(52) U.S. Cl. .................. 379/204.01; 370/260; 709/204

(58) Field of Classification Search ........................ 379/202.01–206.01; 370/260–262, 265, 266; 709/204

See application file for complete search history.

(56) References Cited

U.S. PATENT DOCUMENTS

| | | | |
|---|---|---|---|
| 5,099,510 A | 3/1992 | Blinken et al. | 379/202.01 |
| 5,625,407 A | 4/1997 | Biggs et al. | 348/14.11 |
| 6,011,851 A | 1/2000 | O'Connor et al. | 381/17 |
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,608,820 B1 | 8/2003 | Bradshaw | 370/260 |
| 6,791,999 B1 | 9/2004 | Budhraja et al. | 370/468 |
| 6,792,092 B1 | 9/2004 | Michalewicz | 370/263 |
| 2002/0013813 A1 | 1/2002 | Matsuoka | 709/204 |
| 2002/0129151 A1* | 9/2002 | Yuen et al. | 709/229 |

* cited by examiner

*Primary Examiner*—Benny Quoc Tieu
(74) *Attorney, Agent, or Firm*—Baker Botts, L.L.P.

(57) ABSTRACT

A method and system for participant control of privacy during a multiparty communication session includes receiving a request from a first participant to a multiparty communication connection for a sidebar between the first participant and a second participant to the multiparty communication connection. The sidebar is provided by at least substantially eliminating voice streams generated by the first participant and the second participant from conference output streams generated for a set of remaining participants to the multiparty communication connection.

21 Claims, 5 Drawing Sheets

METHOD AND SYSTEM FOR PARTICIPANT CONTROL OF PRIVACY DURING MULTIPARTY COMMUNICATION SESSIONS

CROSS REFERENCE TO RELATED APPLICATIONS

This application is a continuation of U.S. application Ser. No. 09/751,799 filed Dec. 29, 2000 now U.S. Pat. No. 7,058,168 and entitled "Method and System for Participant Control of Privacy During Multiparty Communication Sessions".

TECHNICAL FIELD OF THE INVENTION

The present invention relates generally to the field of multiparty communications, and more particularly to a method and system for participant control of privacy during multiparty communication sessions.

BACKGROUND OF THE INVENTION

Modern business practices often require that several persons meet on the telephone to engage in a conference call. The conference call has introduced certain applications and techniques that are superior to those found in a meeting with persons physically present in the same location. For example, a conference call attendee who is not participating at the moment may wish to mute their audio output and simply listen to the other conferencee. This allows the particular conferee to work on another project while still participating in the conference.

While the conference call has been substantially helpful in minimizing travel expenses and other costs associated with business over long distances, significant obstacles still remain in accomplishing many tasks with the same efficiency as one would in having a meeting with all persons in the same physical location. For example, while the ability to talk privately to a particular conferencee during a conference call can be provided by offline mechanisms such as text chat channels, this requires the coupling of ASCII entry and display capabilities with a voice terminal on both sides of the private conversation.

SUMMARY OF THE INVENTION

The present invention provides an improved method and system for participant control of privacy during multiparty communication sessions that substantially eliminate or reduce the disadvantages and problems associated with previous systems and methods. In particular, a subset of participants to a conference call or other multiparty communication session may engage in an online sidebar conversation during the conference without the knowledge of the remaining participants.

In accordance with one embodiment of the present invention, a system and method for participant control of privacy during a multiparty communication connection includes receiving a request from a first participant to the multiparty connection for a sidebar between the first participant and a second participant to the multiparty connection. The sidebar is provided by at least substantially eliminating voice streams generated by the first participant and the second participant from the conference output streams generated for a set of remaining participants to the multiparty connection.

More specifically, in accordance with a particular embodiment of the present invention, the voice streams of the first and second participant may be entirely eliminated from the conference output streams generated for the set of remaining participants. In this and other embodiments, voice streams generated by the set of remaining participants may be removed, attenuated, or otherwise minimized from and/or in the conference output streams generated for the first and second participants. The conference output streams may be monaural or stereo streams.

Technical advantages of the present invention include providing an improved method and system for participant control of privacy during multiparty communication sessions. In one or more embodiments, a privacy feature allows a subset of participants to converse online with each other during a multiparty session without the knowledge of the remaining participants. Accordingly, participants on a conference call or other multiparty session may each customize characteristics of the call without affecting other participants.

Another technical advantage of one or more embodiments of the present invention includes providing an improved conference bridge. In particular, the conference bridge provides sidebar conferences between requesting parties of a conference call. Accordingly, the conference bridge allows participants to each customize call characteristics to suit their particular needs and to more efficiently conduct business during the call.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
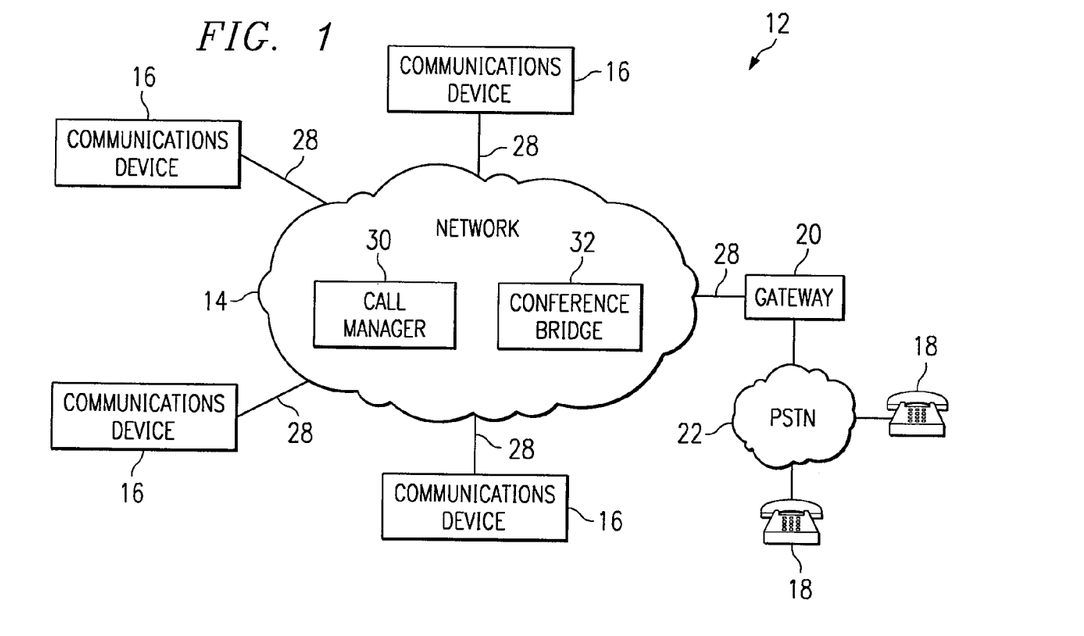
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non real-time traffic between source and destination endpoints.

Referring to FIG. 1, the communications system 12 includes a network 14 connecting a plurality of communication devices 16 to each other and to standard analog telephones 18 through a gateway 20 and the public switched telephone network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable type of wireline or wireless links 28.

In one embodiment, the network 14 is the Internet, a wide area network (WAN), a local area network (LAN) or other suitable packet-switched network. In the Internet embodiment, the network 14 transmits information in Internet Protocol (IP) packets. Telephony voice information is transmitted in the Voice over IP (VoIP) format. Real-time IP packets such as VoIP packets are encapsulated in real-time transport protocol (RTP) packets for transmission over the network 14. It will be understood that the network 14 may comprise any other suitable types of elements and links and that traffic may be otherwise suitably transmitted using other protocols and formats.

The communication devices 16 comprise IP or other digital telephones, personal and other suitable computers or computing devices, personal digital assistants (PDAs), cell or other mobile telephones or handset or any other device or set of devices such as the telephone 18 and gateway 20 combination capable of communicating real-time audio, video and/or other information over the network 14. The communication devices 16 also communicate control information with the network 14 to control call setup, teardown and processing as well as call services.

For voice calls, the communication devices 16 comprise real-time applications that play traffic as it is received or substantially as it is received and to which packet delivery cannot be interrupted without severely degrading performance. A codec (coder/decoder) converts audio, video or other suitable signals generated by users from analog signals into digital form. The digital encoded data is encapsulated into IP or other suitable packets for transmission over the network 14. IP packets received from the network 14 are converted back into analog signals and played to the user. It will be understood that the communication devices 16 may otherwise suitably encode and decode signals transmitted over or received from the network 14.

The gateway 20 provides conversion between analog and/or digital formats. The standard analog telephones 18 communicate standard telephony signals through PSTN 22 to the gateway 20. At the gateway 20, the signals are converted to IP packets in the VoIP format. Similarly, VoIP packets received from the network 14 are converted into standard telephony signals for delivery to the destination telephone 18 through PSTN 22. The gateway 20 also translates between the network call control system and the Signaling System 7 (SS7) protocol and other signaling protocols used in PSTN 22.

In one embodiment, the network 14 includes a call manager 30 and a conference bridge 32. The call manager 30 and the conference bridge 32 may be located in a central facility or have their functionality distributed across and/or at the periphery of the network 14. The call manager 30 and the conference bridge 32 are connected to the network 14 by any suitable type of wireline or wireless link. In another embodiment, the network 14 may be operated without the call manager 30, in which case the communication devices 16 may communicate control information directly with each other or with other suitable network elements. In this embodiment, services are provided by the communication devices 16 and/or other suitable network elements.

The call manager 30 manages calls in the network 14. A call is any communication session between two or more parties. The parties may be persons and/or equipment such as computers. The sessions may include real-time connections, connections having real-time characteristics, non real-time connections and/or a combination of connection types.

The call manager 30 is responsive to service requests from the communication devices 16, including the standard telephones 18 through the gateway 20. For example, the call manager 30 may provide voicemail, bridging, multicasting, call hold, conference call and other multiparty communications and/or other suitable services for the communications devices 16. The call manager 30 provides services by performing the services, controlling performance of the services, delegating performance of the services and/or by otherwise initiating the services.

The conference bridge 32 provides conference call and other suitable audio, video, and/or real-time multiparty communication sessions between communication devices 16. A multiparty communication session includes three or more parties exchanging audio and/or other suitable information. In particular, the conference bridge 32 receives media from participating devices 16 and, using suitable signal processing techniques, mixes the media to produce conference signals. During normal operation, each device 16 receives a conference signal that includes contributions from all other participating devices. As used herein, the term each means everyone of at least a subset of the identified items.

As described in more detail below, the conference bridge 32 provides for independent participant control of privacy during multiparty communications sessions. In particular, the conference bridge 32 provides a privacy feature that allows each participant of a multiparty connection to speak in-band to other selected participants in a sidebar during the session without the knowledge of the remaining participants. Thus, participants on a conference call or other multiparty communications session may each customize parameter for the call to suit their needs without affecting other participants.

In operation, a call initiation request is first sent to the call manager 30 when a call is placed over the network 14. The call initiation request may be generated by a communication device 16 and/or the gateway 20 for telephones 18. Once the call manager 30 receives the call initiation request, the call manager 30 sends a signal to the initiating communication device 16 and/or gateway 20 for telephones 18 offering to call the destination device. If the destination device can accept the call, the destination device replies to the call manager 30 that it will accept the call. By receiving this acceptance, the call manager 30 transmits a signal to the destination device causing it to ring. When the call is answered, the call manager 30 instructs the called device and the originating device to begin media streaming to each other. If the originating device is a PSTN telephone 18, the media streaming occurs between the gateway 20 and the destination device. The gateway 20 then transmits the media to the telephone 18.

For conference calls, the call manager 30 identifies participants based on the called number or other suitable criteria. The call manager 30 controls the conference bridge 32 to set up, process and tear down conference calls and other multiparty communication sessions. During the multiparty communications sessions, participants are connected and stream media through the conference bridge 32. The media is cross connected and mixed to produce conference output streams for each participant. The conference output stream for a participant includes the media of all other participants, a subset of other participants or other suitable mix dictated by the type of multiparty session and/or the participant.

To support independent participant control of privacy, the call manager 30 may receive sidebar control signals from the individual participants and pass the signals onto the conference bridge 32 for implementation of the sidebars by adjustment of the conference output streams. In another embodiment, the communication devices 16 may directly communicate the sidebar control signals to the conference bridge 32 for implementation of the sidebars. The sidebar control signals may comprise sidebars request, acceptance, denial and termination signals as well as parameters for customizing the conference output streams for sidebar participants. The sidebar control signals may be call signaling messages and may be generated by the communication devices 16, telephones 18 and/or gateway 20 by or in response to hard key, soft key, feature button or sequence of keypad presses with a user interface.

Figure 2:
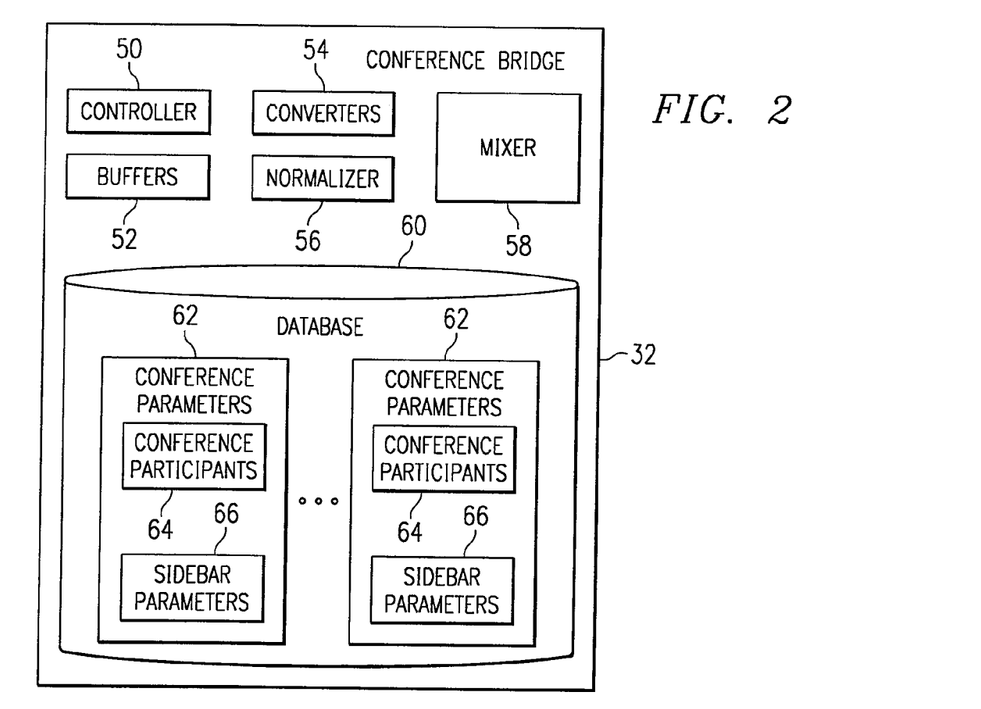
FIG. 2 is a block diagram illustrating details of the conference bridge of FIG. 1 in accordance with one embodiment of the present invention.

FIG. 2 illustrates details of the conference bridge 32 in accordance with one embodiment of the present invention. In this embodiment, the conference bridge 32 provides real-time multiparty audio connections between three or more participants. It will be understood that the conference bridge 32 may support other types of suitable multiparty communications sessions including real-time audio streams without departing from the scope of the present invention.

Referring to FIG. 2, conference bridge 32 concludes a controller 50, buffers 52, converters 54, normalizer 56, mixer 58 and database 60. The controller 50, buffers 52, converters 54, normalize 56, adaptive summers 58 and database 60 of the conference bridge as well as other suitable components of the communications system 12 may comprise logic encoded in media. Logic comprises functional instructions for carrying out programmed tasks. The media comprises computer disks or other suitable computer-readable media, applications specific integrated circuits (ASIC), field programmable gate arrays (FPGA) or other suitable specific or general purpose processors, transmission media or other suitable media in which logic may be encoded and utilized.

The controller 50 directs the other components of the conference bridge 32 and communicates with the call manager 30 to set up, process and tear down conference calls. The controller 50 also receives sidebar control signals from participants either directly from the communication devices 16 or through the call manager 30. The sidebar control signals are stored in the database 60.

The buffers 52 include input and output buffers. The input buffers receive and buffer packets of input audio streams from participants for processing by the conference bridge 32. The output buffers receive and buffer conference output streams generated by the conference bridge 32 for transmissions to participants. In a particular embodiment, a particular input buffer or set of input buffer resources are assigned to each audio input stream and a particular output buffer or set of output buffer resources are assigned to each conference output stream. The input and output buffers may be associated with corresponding input and output parts or interfaces and perform error check, packet loss prevention, packet ordering and congestion control functions.

The converters 54 include input and output converters. The input converters receive input packets of a participant from a corresponding buffer and convert the packet from the native format of the participant's device 16 to a standard format of the conference bridge 32 for cross linking and processing in the conference bridge 32. Conversely, the output converters receive conference output streams for participants in the standard format and convert the conference output streams to the native format of participant's devices. In this way, the conference bridge 32 allows participants to connect using a variety of devices and technologies.

The normalizers 56 include input and/or output normalizers. The normalizers received packets from the input audio streams in a common format and normalize the timing of the packets for cross connections in the mixer 58.

The mixer 58 includes a plurality of summers or other suitable signal processing resources each operable to sum, add or otherwise combine a plurality of input streams into conference output streams for participants to a conference call. As described in more detail below, the mixer 58 may be a monaural mixer or a stereo mixer. Once the mixer 58 has generated the conference output streams, each conference output stream is converted by a corresponding converter and buffered by a corresponding output buffer for transmission to the corresponding participant.

The database 60 includes a set of conference parameters 62 for each ongoing conference call of the conference bridge 32. The conference parameters 62 for each conference call include an identification of participants 64 and sidebar parameters 66 for the conference call. In one embodiment, the participants are identified at the beginning of a conference call based on caller ID, phone number or other suitable identifier. The sidebar parameters may be initially set to a default value of no sidebars and adjusted during a conference call based on sidebar control signals. The sidebar request and other sidebar control signals may be received from the participants in-band with the audio stream or over a control link or channel. Each sidebar signal should directly or indirectly identify the participant generating the signal as well as the sidebar and/or participants to which it applies.

Figure 3:
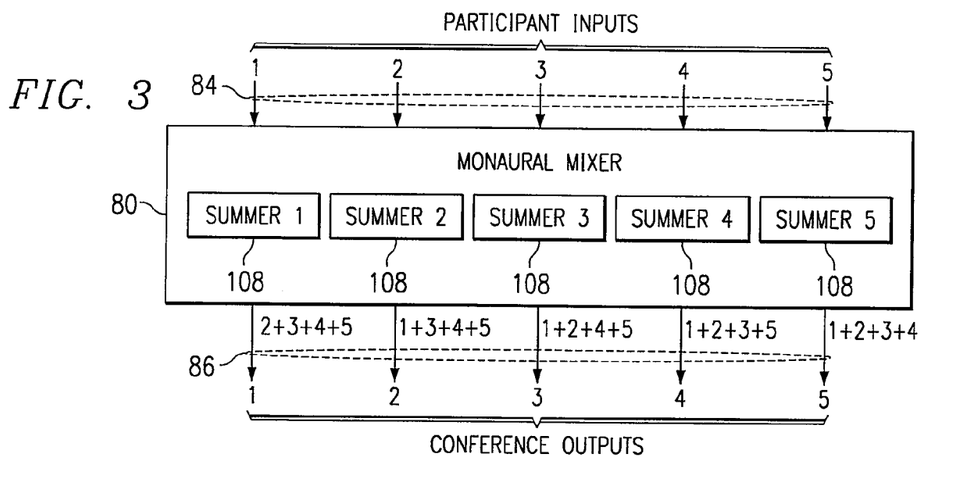
FIG. 3 is a block diagram illustrating a monaural mixer for the conference bridge of FIG. 2 in accordance with one embodiment of the present invention.
Figure 4:
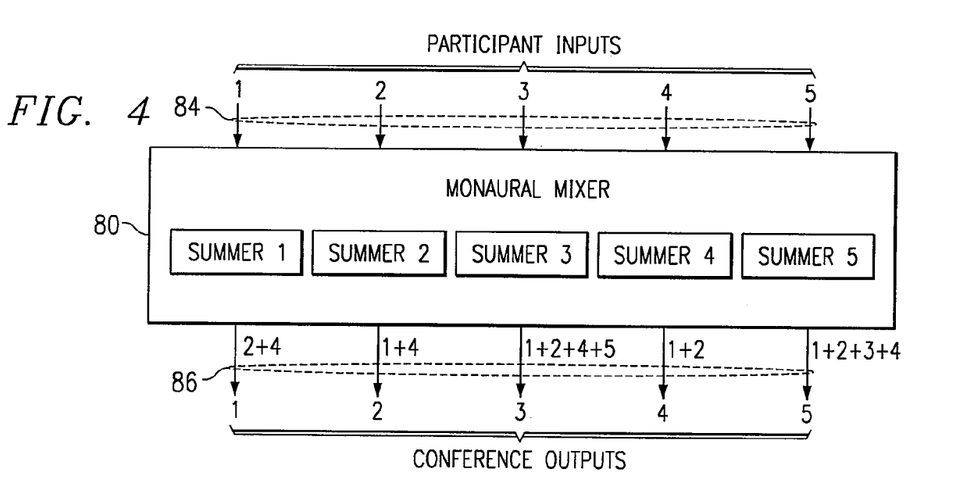
FIG. 4 is a block diagram illustrating the monaural mixer of FIG. 3 configured to provide a sidebar conference during a conference call in accordance with one embodiment of the present invention.
Figure 5:
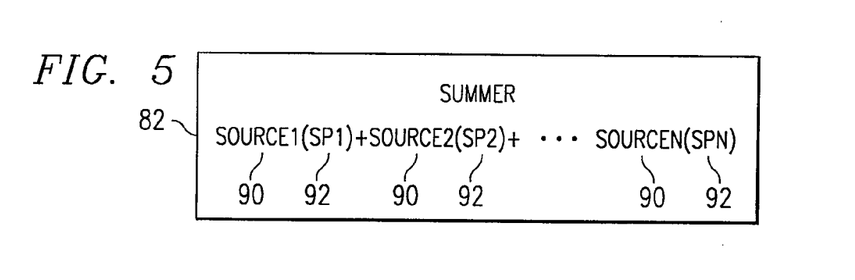
FIG. 5 is a block diagram illustrating a summer for the monaural mixer of FIG. 3 in accordance with one embodiment of the present invention.

FIGS. 3–5 illustrate components and operation of the mixer 58 in a monaural embodiment of the present invention. In particular, FIG. 3 illustrates details of a monaural mixer 80 in accordance with a particular embodiment. FIG. 4 illustrates the monaural mixer 80 configured to provide a sidebar conference between selected participants of a conference call. FIG. 5 illustrates details of a summer 82 of the monaural mixer 80. It will be understood that a monaural mixer may be otherwise suitably implemented without departing from the scope of the present invention.

Referring to FIG. 3, the monaural mixer 80 receives participant input streams 84 and combines the streams in summers 82 to generate conference output streams 86 for each participant to a conference call. In one embodiment, each participant is assigned a summer 82 that receives audio input streams from each other participant to the conference call and sidebar parameters for the input streams. The summer 82 combines the audio input streams based on the sidebar parameters to generate a conference output stream for delivery to the participant.

The summers 82 may each store relevant sidebar parameters or may access the database 60 to obtain the sidebar parameters. The sidebar parameters may be dynamically changed in response to sidebar requests and other signals from participants during a conference call to allow multiple sidebars between participants to the conference call.

During normal operation in which no sidebars are occurring, each participant receives the audio input of each other participant. Thus, for example, the conference output stream of participant 1 includes the audio inputs of participants 2–5. Similarly, the conference output stream of participant 2 includes the audio inputs of participants 1 and 3–5. The conference output stream of participant 3 includes the audio inputs of participants 1–2 and 4–5. The conference output stream of participant 4 includes the audio inputs of participants 1–3 and 5. The conference output stream of participant 5 includes the audio inputs of participants 1–4.

Referring to FIG. 4, during a sidebar between two or more participants to the conference call, the conference output stream 86 of each sidebar participant includes the audio input 84 of each other sidebar participant as well as the audio input 84 of each remaining participant not included in the sidebar. The audio input 84 of the sidebar participants may be amplified or the audio input 84 of the remaining participants attenuated to focus on or provide higher prominence to the audio input 84 of the sidebar participants. A higher prominence is provided by increasing the intelligibility of the sidebar participants relative to the remaining participants.

The conference output streams 86 of the remaining participants include only or substantially only the audio inputs 84 of the other remaining participants not involved in the sidebar. The conference output streams include substantially only the audio input of the other remaining participants when the audio input of the sidebar participants is attenuated to the point where it is not intelligible or cannot be mentally focused on by a listener in the presence of other sound sources. Thus, the sidebar conversation remains private between the selected sidebar participants while the remaining participants are unaware and/or unaffected by the sidebar. In another embodiment to the single stage monaural mixer 100, the sidebar conference output streams may be generated by a monaural mixer with a second stage monaural sidebar mixer as described for a stereo embodiment in connection with FIG. 8.

For an exemplary sidebar between participants 3 and 5 during a conference call between participants 1–5, the conference output stream of participant 3 includes the audio inputs of participants 1–2 and 4–5 while the conference output stream for participant 5 includes the audio inputs of participants 1–4. Thus, the sidebar participants hear each other as well as the remaining participants to the conference call. The conference output stream for participant 1 includes only the audio inputs of participants 2 and 4 while the conference output stream for participant 2 includes only the audio inputs of participants 1 and 4 and the conference output stream of participant 4 includes only the audio inputs of participants 1 and 2. Thus, the conversation between participants 3 and 5 engaged in the sidebar remain private between those participants.

Referring to FIG. 5, each summer 82 of the monaural conference bridge 80 includes source input streams 90 from participants and a sidebar parameter 92 for each source input stream 90. Each source input stream 90 is multiplied by the corresponding sidebar parameter 92 to generate a resultant source input stream that is then combined with the other resultant source input streams to generate the conference output stream.

For a sidebar participant, the audio streams of the other sidebar participants may be made prominent in the conference output stream by using the sidebar parameters to amplify the source input streams 90 of the sidebar participants or by using the sidebar parameters to attenuate the source input streams 90 of the non-sidebar participants. For example, the source input streams 90 of sidebar participants may be multiplied by a sidebar parameter of "1.2" while the audio input streams of the non-sidebar participants are multiplied by a sidebar parameter of "0.8".

For non-sidebar participants, the audio input streams 90 of the sidebar participants may be multiplied by a sidebar parameter of zero or substantially zero to effectively remove or eliminate the audio inputs of the sidebar participants from the conference output streams of the non-sidebar participants. The audio input of the other remaining participants not involved in the sidebar may be multiplied by a neutral sidebar parameter to provide equal weight to each of the remaining audio inputs. It will be understood that the audio input streams 90 of sidebar participants may be otherwise eliminated from the conference output streams of the non-sidebar participants and that the contribution of sidebar participants to the conference output streams of other sidebar participants may be otherwise focused on relative to the non-participants without departing from the scope of the present invention.

Figure 6:
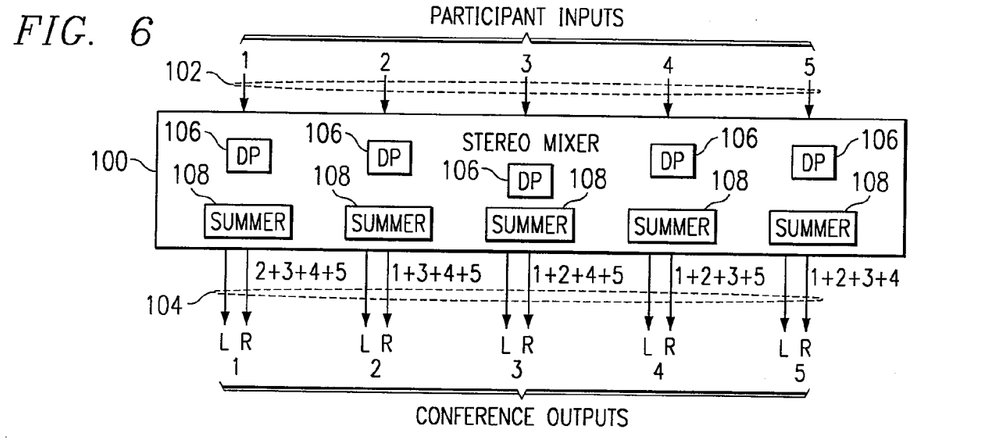
FIG. 6 is a block diagram illustrating a stereo mixer for the conference bridge of FIG. 2 in accordance with one embodiment of the present invention.
Figure 7:
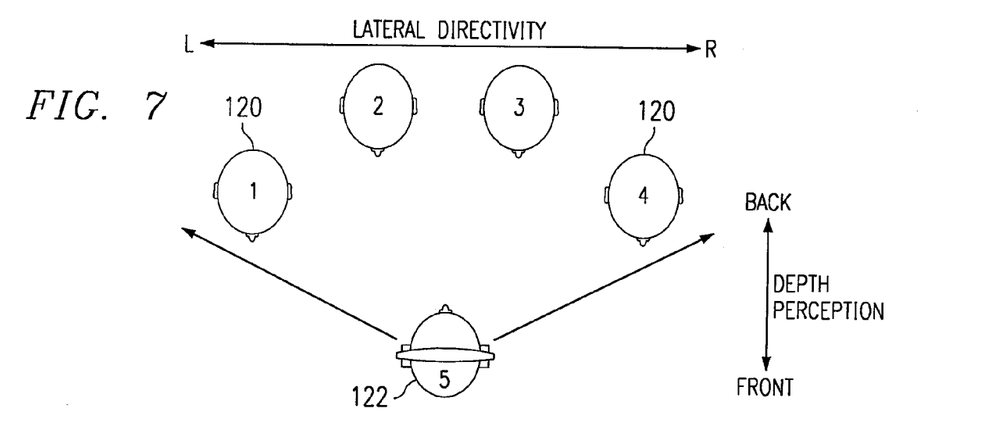
FIG. 7 is a block diagram illustrating spatial placements of participants in a stereo conference stream generated by the stereo mixer of FIG. 6 in accordance with one embodiment of the present invention.
Figure 8:
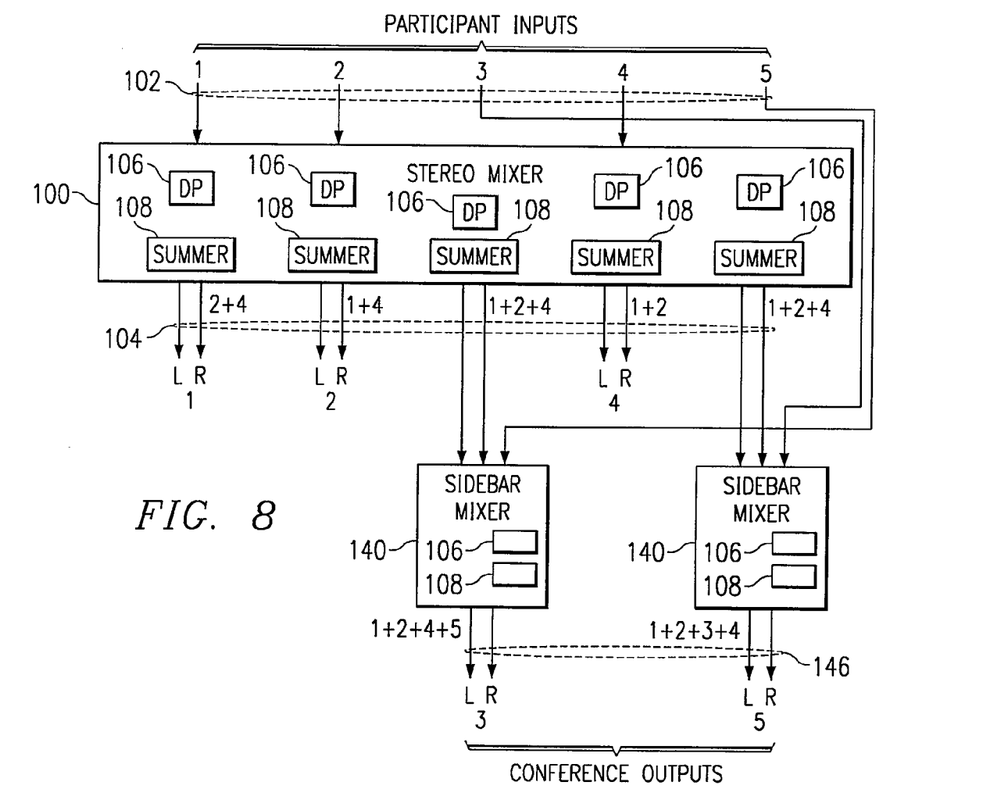
FIG. 8 is a block diagram illustrating the stereo mixer of FIG. 6 configured to provide a sidebar conference during a conference call in accordance with one embodiment of the present invention.
Figure 9:
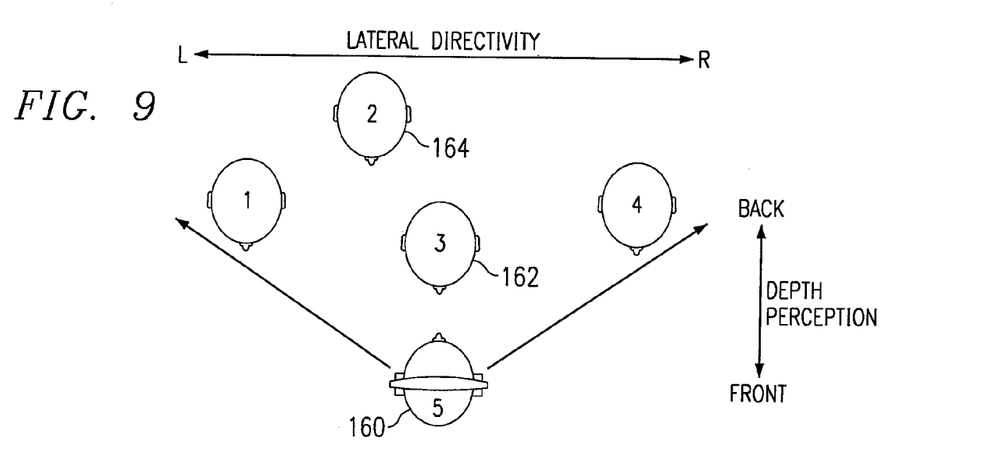
FIG. 9 is a block diagram illustrating spatial movement of sidebar participants to a position of higher prominence in a stereo conference stream in accordance with one embodiment of the present invention.
Figure 10:
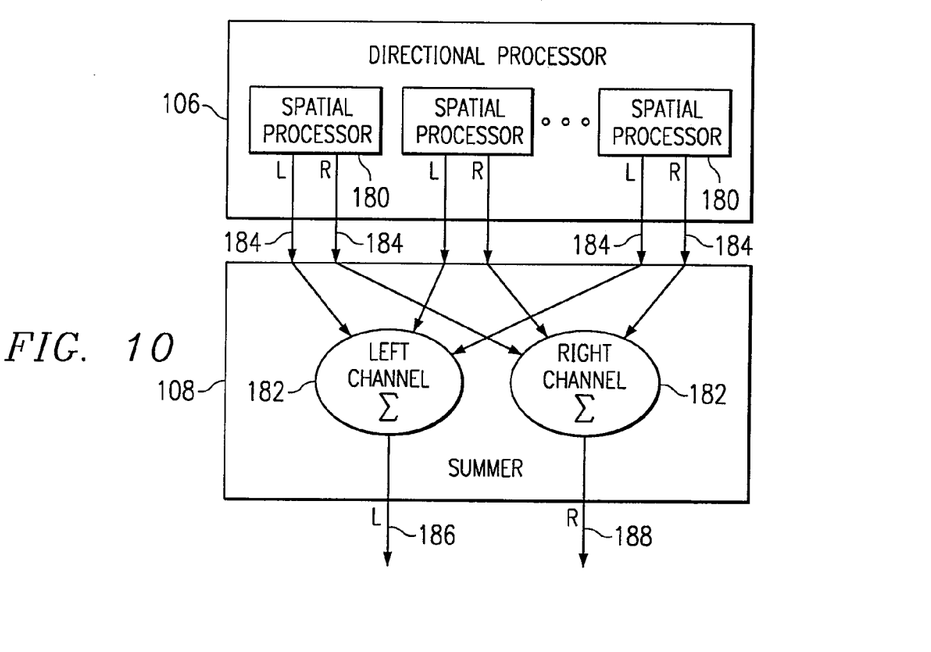
FIG. 10 is a block diagram illustrating the directional processors and summers of the stereo mixer of FIG. 6 in accordance with one embodiment of the present invention.

FIGS. 6–10 illustrate components and operation of the mixer 58 in a stereo embodiment of the present invention. In particular, FIG. 6 illustrates details of a stereo mixer 100 in accordance with a particular embodiment. FIG. 7 illustrates spatial positioning of participant audio in a stereo conference stream of a conference call participant. FIG. 8 illustrates the stereo mixer 100 configured to provide a sidebar conference between selected participants of a conference call. FIG. 9 illustrates spatial positioning of participant audio in a stereo conference stream of a sidebar participant. FIG. 10 illustrates details of a directional processor 106 and a summer 108 of the stereo mixer 100.

Referring to FIG. 6, the stereo mixer 100 receives participant input streams 102 and generates stereo conference output streams 104 using the directional processors 106 and the summers 108. In one embodiment, each participant is assigned a directional processor 106 and a summer 108. The directional processor 106 receives audio input streams 102 from other participants to the conference call and generates spatially positioned stereo streams that are combined by the summer 108 to generate the stereo conference output streams 104. Each stereo conference output stream 104 includes a left (L) and a right (R) channel.

During normal operation in which no sidebars are occurring, each participant receives the audio input of each other participant to a conference call. Thus, for example, the stereo conference output stream for participant 1 includes the audio inputs of participants 2–5. Similarly, the stereo conference output stream for participant 2 includes the audio inputs from participants 1 and 3–5. The stereo conference output stream for participant 3 includes the audio inputs of participants 1–2 and 4–5. The stereo conference output stream for participant 4 includes the audio inputs from participants 1–3 and 5. The stereo conference output stream for participant 5 includes the audio inputs from participants 1–4.

Referring to FIG. 7, each stereo conference output stream 104 includes audio inputs or sources 120 from the other participants or groups of participants that are perceived by the listener 122 as coming from different spatial locations. The spatial locations vary from front to back in the listener's depth perception and from left to right in the listener's lateral directivity. Because the sound sources are spatially separated, the listener 122 can more easily focus on individual sound sources of auditory information in the presence of other sound sources. Thus, the spatial separation of the sound sources 120 increases the ability of the listener 122 to differentiate between the multiple sound sources 120.

In the illustrated embodiment, each participant 1–4 is spatially positioned in front and at an equal distance from the participant 5. In this configuration, each participant 1–4 has an equal degree or substantial degree of prominence with respect to the participant 5. As described in more detail below, participants 1–4 in the stereo conference output stream 104 may be repositioned to the foreground to provide a higher degree of intelligibility and prominence to participant 5.

Referring to FIG. 8, during a sidebar between two or more participants to the conference call, the audio input 102 of the sidebar participants bypasses the stereo mixer 100 and is fed to sidebar mixers 140 while the audio input 102 of the remaining non-sidebar participants is fed to the stereo mixer 100 and spatially positioned and combined as previously described. The stereo conference output streams 104 generated for the non-sidebar participants are transmitted to the participants while the stereo conference output streams 104 generated by the stereo mixer 100 for the sidebar participants are fed to the sidebar mixers 140.

The sidebar mixer 140 of each sidebar participant receives the monaural audio input 102 of each other sidebar participant. A directional processor 106 generates spatially positioned stereo streams for the audio inputs 102 that are combined in a summer 108 with each other and with the stereo conference output stream 104 from the stereo mixer 100 to generate a stereo sidebar conference output stream 146. Accordingly, each sidebar participant receives the audio inputs 102 from the other sidebar participants as well as the audio inputs 102 from the remaining non-sidebar participants to the conference call. The non-sidebar participants receive only the audio inputs 102 from the other non-sidebar participants. Thus, the sidebar remains private between the selected sidebar participants while the remaining participants are unaware and/or unaffected by the sidebar. In an alternative to the two stage stereo and sidebar mixers 100 and 140, the stereo sidebar conference output streams may be generated by a single stage stereo mixer as described for a monaural embodiment in connection with FIG. 4.

For an exemplary sidebar between participants 3 and 5 during a conference call between participants 1–5, the audio input of the participants 1, 2 and 4 are fed to the stereo mixer 100 and cross-connected as previously described. Thus, the stereo conference output stream 104 for participant 1 includes audio inputs from participants 2 and 4. The stereo conference output stream 104 for participant 2 will include audio input from participants 1 and 4. The stereo conference output stream 104 for participant 3 includes audio input from participants 1, 2 and 4. The stereo conference output stream 104 for participant 4 includes audio input from participants 1 and 2. The stereo output stream 104 for participant 5 includes audio input from participants 1, 2 and 4.

The stereo conference output stream for participant 3 is fed to sidebar mixer 140 and combined with the audio input 102 of sidebar participant 5 to generate a stereo sidebar conference stream 146. Similarly, the conference output stream 104 for sidebar participant 5 is fed to stereo mixer 140 and combined with the audio input 102 of participant 3 to generate a stereo sidebar conference output stream 146 for participant 5. Thus, participants 3 and 5 may hear each other as well as the other conference call participants while the remaining conference call participants will hear only each other and not sidebar participants 3 or 5.

Referring to FIG. 9, the stereo sidebar conference output stream 146 for sidebar participant 5, for example, includes the audio input of other sidebar participant 3 in the foreground with the non-sidebar participants 1, 2 and 4 in the background. The foreground position provides participant 5 or other listener 160 with the highest degree of intelligibility such that the listener may focus on sidebar participant 3 or other sidebar audio sources 162 while still hearing non-sidebar sources 164 in the background. It will be understood that sidebar participants 162 may be in the background and may be otherwise suitably positioned in the stereo sidebar conference output stream 146 or focused on relating to the non-sidebar participants without departing from the scope of the present invention.

Referring to FIG. 10, the directional processor 106 of the stereo mixer 100 includes a plurality of spatial processors 180 and the summer 108 includes a left and right channel summers 182. The spatial processors 180 each present monaural sources at different locations in a binaural sound field using standard intensity panning and/or Head Related Transfer Function (HRTF) position filtering. The binaural sound streams each include left and right channels components 184 generating a perceived position such as, for example, back/left front/center and back/right. The left channel of each binaural stream is fed to the left channel summer 182 while the right channels are fed to the right channel summer 182. The summers 182 generate a combined left stream 186 and combined right stream 188 including a perceived plurality of discrete audio inputs spatially positioned in two or three dimensional space relative to the listener. Further information regarding the directional processor 106 and summer 108 are provided in co-owned U.S. Pat. No. 6,011,851, which is hereby incorporated by reference. It will be understood that stereo mixer 100 and sidebar mixers 140 may be otherwise suitably implemented without departing from the scope of the present invention.

Figure 11:
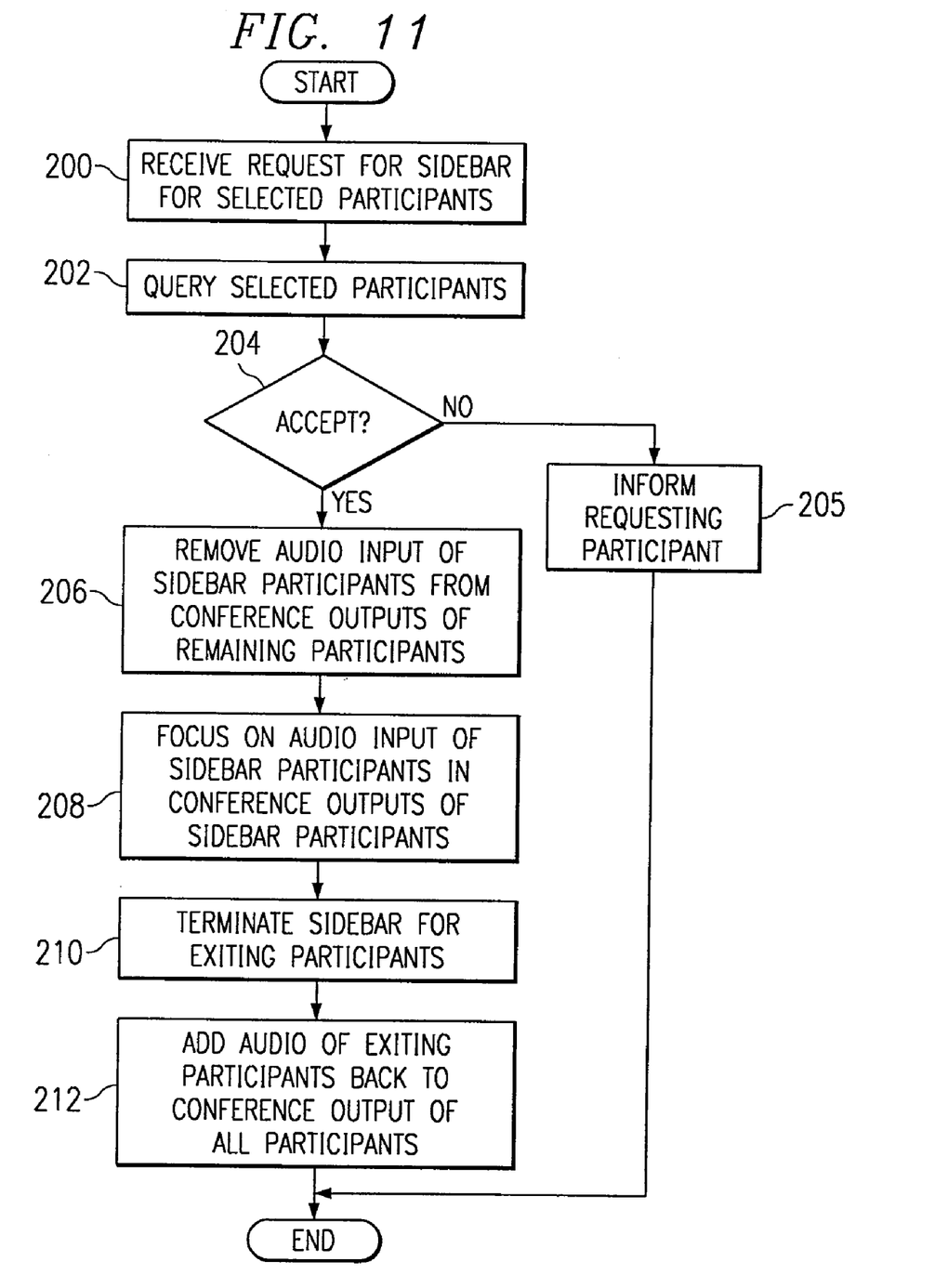
FIG. 11 is a flow diagram illustrating a method for providing sidebars during a conference call in accordance with one embodiment of the present invention.

FIG. 11 illustrates a method for providing a sidebar conference between conference call participants in accordance with one embodiment of the present invention. As previously described, the sidebar may be provided using monaural mixing or using stereo mixing with binaural presentation to spatially separate incoming monaural voice streams for improved intelligibility of multiple talkers by the listeners.

Referring to FIG. 11, the method begins at step 200 in which the request for a sidebar conference is received from a conference call participant. The requesting participant may use soft keys, a graphical user interface or other suitable user interface to signal selected participants that the requestor wishes to engage in a sidebar. The request may be received directly by the conference bridge 32 or via the call manager 30. At step 202, the selected participants are queried as to whether they want to engage in the sidebar with a requesting participant. The selected participants may be signaled through visual or other suitable indicators at their terminals that a sidebar request has been received from the requesting, or initiating participant. The selected participant has the option to enter the sidebar by accepting through a non-audible or other suitable user interface acknowledgment. In one embodiment, if no reply is sent, the default is to not accept the sidebar conference.

Proceeding to decisional step 204, if the selected participants do not accept the sidebar or for those selected participants not accepting the sidebar, the No branch of decisional step 204 leads to step 205 in which the initiating participant is informed that the requested sidebar has not been accepted. Step 205 leads to the end of the process with a conference call continuing as usual.

Returning to decisional step 204, if the selected participants accept the sidebar or for those selected participants accepting the sidebar, the Yes branch of decisional step 204 leads to step 206. At step 206, the audio input of the sidebar participants is removed from the conference output streams of the remaining participants to allow the sidebar participants to speak privately. As previously described, the audio input to the sidebar participants may be removed from the conference output streams of the non-sidebar participants by rerouting the audio inputs or mixing them at a level of zero or substantially zero.

At step 208, the audio input of sidebar participants is raised in prominence in the sidebar conference streams of each sidebar participant. In the stereo embodiment, the audio input of other sidebar participants is moved spatially from an equivalent position relative to non-sidebar participants to front and center or other position of higher prominence. During the sidebar, the sidebar participant's conversation is directed solely to the other sidebar participants even though the non-sidebar participants can continue to be heard in the background by the sidebar participants.

Next, at step 210, the sidebar is terminated in its entirety or terminated for one or more sidebar participants who are exiting the sidebar where the sidebar includes more than two parties. The sidebar may be terminated by a sidebar participant and made known to the other sidebar participants through a non-audible or other suitable user interface signal. At step 212, upon sidebar termination by each participant of the sidebar, the audio input of the exiting participant is added back to the conference output streams of all remaining participants and all participants are moved to positions of equal prominence or to the sidebar positions. Step 212 leads to the end of the process by which participants to a conference call may engage in a sidebar during the conference call and in which each participant has control over whether and when to engage in a sidebar and when to terminate or exit from the sidebar.

Although the present invention has been described with several embodiments, various changes and modifications may be suggested to one skilled in the art. It is intended that the present invention encompass such changes and modifications as fall within the scope of the appended claims.

What is claimed is:

1. A method for participant control of privacy during a multiparty communication connection, comprising:
receiving a request from a first participant to the multiparty communication connection for a sidebar between the first participant and a second participant to the multiparty communication connection; and
providing the sidebar by altering the spatial positioning of voice streams generated by a set of remaining participants to the multiparty communication connection relative to a voice stream of the other participant to the sidebar in conference output streams generated for the first and second participants.

2. The method of claim 1, further comprising providing the sidebar by eliminating a voice stream generated by the first participant and a voice stream generated by the second participant from conference output streams generated for the set of remaining participants.

3. The method of claim 2, further comprising:
requesting permission from the second participant for the sidebar; and
in response to at least approval by the second participant, providing the sidebar by at least substantially eliminating the voice stream generated by the first participant and the voice stream generated by the second participant from conference output streams generated for the set of remaining participants.

4. The method of claim 1, further comprising providing the sidebar by substantially eliminating voice streams generated by the set of remaining participants from conference output streams generated for the first and second participants.

5. The method of claim 1, further comprising eliminating voice streams generated by the set of remaining participants from conference output streams generated for the first and second participants.

6. The method of claim 1, wherein the multiparty connection comprises a conference call.

7. The method of claim 1, further comprising generating conference output streams for each participant to the multiparty communication connection at a conference bridge.

8. The method of claim 1, further comprising providing the sidebar by spatially positioning the voice stream generated by the other participant to the sidebar forward of voice streams generated by the set of remaining participants in the conference output stream generated for the first and second participants.

9. A system for participant control of privacy during a multiparty communication connection, comprising:
logic encoded on media; and
the logic operable to receive a request from a first participant for a sidebar between the first participant and a second participant and to provide the sidebar by altering the spatial positioning of voice streams generated by a set of remaining participants to the multiparty communication connection relative to a voice stream of the other participant to the sidebar in conference output streams generated for the first and second participants.

10. The system of claim 9, the logic further operable to provide the sidebar by eliminating a voice stream generated by the first participant and a voice stream generated by the second participant from conference output streams generated for the set of remaining participants.

11. The system of claim 10, the logic further operable to request permission from the second participant for the sidebar and in response to at least approval by the second participant to provide the sidebar by at least substantially eliminating the voice stream generated by the first participant and the voice stream generated by the second participant from conference output streams generated for the set of remaining participants.

12. The system of claim 9, the logic further operable to provide the sidebar by substantially eliminating voice streams generated by the set of remaining participants from conference output streams generated for the first and second participants.

13. The system of claim 9, the logic further operable to eliminate voice streams generated by the set of remaining participants from conference output streams generated for the first and second participants.

14. The system of claim 9, wherein the multiparty connection comprises a conference call.

15. The system of claim 9, further comprising a conference bridge including the logic encoded on media.

16. The system of claim 9, the logic further operable to provide the sidebar by spatially positioning the voice stream generated by the other participant to the sidebar forward of voice streams generated by the set of remaining participants in the conference output stream generated for the first and second participants.

17. A system for participant control of privacy during a multiparty communication connection, comprising:
   means for receiving a request from a first participant to the multiparty communication connection for a sidebar between the first participant and a second participant to the multiparty communication connection; and
   means for providing the sidebar by altering the spatial positioning of voice streams generated by a set of remaining participants to the multiparty communication connection relative to a voice stream of the other participant to the sidebar in conference output streams generated for the first and second participants.

18. A method for participant control of privacy during a multiparty communication connection, comprising:
   receiving a request from a first participant to the multiparty communication connection for a sidebar between the first participant and a second participant to the multiparty communication connection; and
   providing the sidebar by:
      substantially eliminating voice streams generated by the first participant and the second participant from conference output streams generated for a set of remaining participants to the multiparty communication connection; and
      at least substantially eliminating voice streams generated by the set of remaining participants from conference output streams generated for the first and second participants.

19. The method of claim 18, further comprising eliminating voice streams generated by the set of remaining participants from conference output streams generated for the first and second participants.

20. A system for participant control of privacy during a multiparty communication connection, comprising:
   logic encoded on media; and
   the logic operable to receive a request from a first participant to the multiparty communication connection for a sidebar between the first participant and a second participant to the multiparty communication connection and to provide the sidebar by:
      substantially eliminating voice streams generated by the first participant and the second participant from conference output streams generated for a set of remaining participants to the multiparty communication connection; and
      at least substantially eliminating voice streams generated by the set of remaining participants from conference output streams generated for the first and second participants.

21. The system of claim 20, the logic further operable to eliminate voice streams generated by the set of remaining participants from conference output streams generated for the first and second participants.

* * * * *